United States Patent [19]
Kujirai et al.

[11] Patent Number: 5,519,964
[45] Date of Patent: May 28, 1996

[54] COMPOSITE PLASTIC FILM AND GREENHOUSE BUILT THEREWITH

[75] Inventors: Masami Kujirai; Yumiko Kujirai, both of Kawaguchi; Yukio Kujirai, Warabi, all of Japan

[73] Assignee: Kabushiki Kaisha Sekuto Kagaku, Japan

[21] Appl. No.: 338,868

[22] Filed: Nov. 14, 1994

[30] Foreign Application Priority Data

Nov. 18, 1993 [JP] Japan ....................... 5-289455

[51] Int. Cl.$^6$ ....................... A01G 9/00
[52] U.S. Cl. ....................... 47/17; 47/DIG. 6
[58] Field of Search ........... 47/17 MD, 17 FM, 47/DIG. 6

[56] References Cited

U.S. PATENT DOCUMENTS

| | | | |
|---|---|---|---|
| 3,043,709 | 7/1962 | Amborski | 47/17 MD |
| 3,914,469 | 10/1975 | Delano | 47/17 MD |
| 4,214,034 | 7/1980 | Kodera | 47/17 MD |
| 4,250,661 | 2/1981 | Kodera et al. | |
| 4,895,904 | 1/1990 | Allingham | 47/17 MD |

FOREIGN PATENT DOCUMENTS

| | | | |
|---|---|---|---|
| 0146394A3 | 6/1985 | European Pat. Off. | |
| 2442006 | 7/1980 | France | 47/17 MD |
| 2682678 | 4/1993 | France | 47/17 MD |
| 2906306 | 8/1979 | Germany | 47/17 MD |
| 90960 | 5/1983 | Japan | 47/17 MD |
| 2132963 | 1/1987 | Japan | 47/17 MD |
| 3276536 | 11/1988 | Japan | 47/17 MD |
| 1182037 | 7/1989 | Japan | 47/17 MD |
| 1200957 | 8/1989 | Japan | 47/17 MD |
| 2251447 | 10/1990 | Japan | 47/17 MD |
| 3216120 | 9/1991 | Japan | 47/17 MD |
| 3277216 | 12/1991 | Japan | 47/17 MD |
| 4-133731 | 5/1992 | Japan . | |
| 4-142369 | 5/1992 | Japan . | |
| 2114577 | 8/1983 | United Kingdom . | |
| 2578 | 5/1987 | WIPO | 47/17 MD |

*Primary Examiner*—Henry E. Raduazo
*Attorney, Agent, or Firm*—Wenderoth, Lind & Ponack

[57] ABSTRACT

Disclosed are a composite plastic film and a greenhouse constructed by using the same as a covering sheet spread over a framework capable of exhibiting improved temperature elevation-suppressing effect in summer and improved warm-keeping effect in winter. The composite film has a double-layered structure consisting of a transparent or translucent thermoplastic resin film as the substrate and a transparent overlayer of a polymeric resin formed on one surface of the substrate film and these two layers are correlated each with the other in relation to two newly defined parameters including "the total heat volume", which is a product of the overall weight and the specific heat capacity of the film, and "the absorptivity of radiation heat" defined in terms of the decrease in the radiation temperature of sunlight by transmitting the film, the overlayer having the total heat volume not exceeding 10% of that of the substrate film and the absorptivity of radiation heat not exceeding 60% of that of the substrate film.

9 Claims, 3 Drawing Sheets

COMPOSITE PLASTIC FILM AND GREENHOUSE BUILT THEREWITH

BACKGROUND OF THE INVENTION

The present invention relates to a composite plastic film and a greenhouse built therewith as a light-transmitting covering sheet material. More particularly, the invention relates to a double-layered composite plastic film capable of exhibiting, when used as a covering sheet material of a greenhouse for plant growing, a very favorable effect for growing of plants that the decrease in the inside temperature of the greenhouse is relatively small in a winter season and the increase in the inside temperature of the greenhouse is not unduly large in a summer season without substantially decreasing the amount of insolation to the growing plants as well as a greenhouse built therewith.

As is well known, it is a wide prevalence in the agriculture and horticulture that various kinds of crops including vegetables and floral plants as well as some fruit trees are grown under an artificially controlled climatic conditions in a greenhouse built with a framework and covered with a transparent or translucent plastic film spread on the framework in place of traditional glass panes. In some cases, so-called "tunnel growing" is practiced in which each ridge of the plant-growing field is covered with a tunnel-like shell made from a transparent or translucent plastic film supported by semicircular frames so as to protect the growing plants from direct influences of ambient conditions. A greenhouse should have an effect that, when the outside air temperature is low, for example, in winter, dissipation of the heat from inside to the outside of the greenhouse is prevented so as to moderate the temperature decrease in the greenhouse and, when the outside air temperature is too high, for example, in summer with a large amount of insolation, entering of the sunlight energy is decreased so as to facilitate growing of the plants.

Various thermoplastic resins are conventionally used as the material for the above mentioned transparent or translucent plastic films as a covering material of greenhouses including polyvinyl chloride resins, polyolefin resins, polyacrylate resins and the like in the form of a single film, sheet or plate. A problem in a greenhouse built with these conventional plastic films or sheets is that the effect of temperature-modulation to be obtained in the greenhouse is not always high enough so that the artificially controlled climatic conditions are far from ideal for the growing of the plants. Accordingly, it is sometimes attempted to increase the thickness of the plastic film or to use a plastic film in which a substantial amount of a filler is compounded with an object to improve the temperature-modulating effect. These measures are in fact effective to some extent for the modulation of the changes in the climatic conditions in the greenhouse under changes in the ambient temperature while it is unavoidable that transmission of the light of the wavelength effective for the growth of plants is decreased so much if not to mention the increase in the costs of the plastic films.

Accordingly, it is eagerly desired to develop a transparent or translucent plastic film which can be used as a covering material of a greenhouse to exhibit an excellent effect of temperature modulation that the inside temperature of the greenhouse can be kept relatively high when the outside air temperature is low while increase in the inside temperature of the greenhouse can be suppressed when the outside air temperature is high without unduly decreasing the amount of insulation into the greenhouse.

SUMMARY OF THE INVENTION

The present invention accordingly has an object to provide a novel and improved transparent or translucent plastic film which can be used as a covering sheet material of a greenhouse capable of exhibiting excellent effect of temperature modulation in the inside of a greenhouse that the inside temperature of the greenhouse can be kept relatively high when the outside air temperature is low while increase in the inside temperature of the greenhouse can be suppressed when the outside air temperature is high without unduly decreasing the amount of insolation into the greenhouse as well as to provide an improved greenhouse built with such an improved plastic film as the covering sheet material.

Thus, the transparent or translucent plastic film of the present invention is a double-layered composite film consisting of:

(a) a first layer which is a transparent or translucent substrate film of a thermoplastic resin or resin composition; and (b) a second layer which is a transparent overlayer formed from a polymeric resin on one surface of the substrate film, the overlayer having a total heat volume not exceeding 10% of the total heat volume of the substrate film and having an absorptivity of radiation heat not exceeding 60% of the absorptivity of radiation heat of the substrate film.

Further, the greenhouse of the present invention is a construction having a structure comprising:

(A) a framework; and (B) a covering sheet material spread over and connected to the framework, which is a double-layered transparent or translucent composite plastic film consisting of:

(a) a first layer which is a transparent or translucent substrate film of a thermoplastic resin or resin composition; and (b) a second layer which is a transparent overlayer formed from a polymeric resin on one surface of the substrate film, the overlayer having a total heat volume not exceeding 10% of the total heat volume of the substrate film and having an absorptivity of radiation heat not exceeding 60% of the absorptivity of radiation heat of the substrate film, preferably, with the overlayer facing inwardly and the substrate film facing outwardly in a cold season and vice versa in a hot season.

DETAILED DESCRIPTION OF THE PREFERRED EMBODIMENTS

Figure 1:
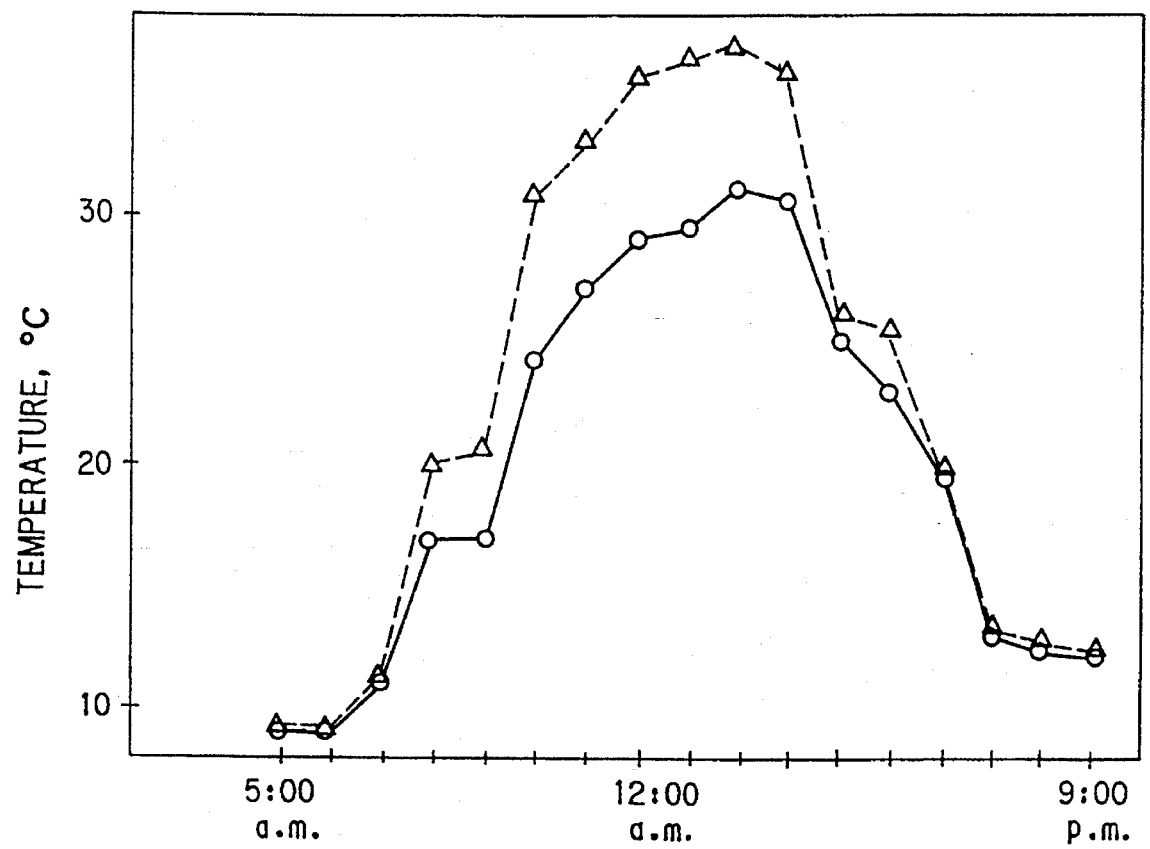
FIG. 1 is a graph obtained in Example 4 showing the temperature change in the greenhouse of the invention from morning to night of a day making comparison with that in a convention of greenhouse.

As is described above, the transparent or translucent plastic film of the invention is a double-layered composite film consisting of a substrate film and an overlayer uniquely characterized in terms of the relative values of two parameters including the total heat volume and the absorptivity of radiation heat. This novel and unique composite plastic film has been developed as a result of the extensive investigations undertaken by the inventors with an object to obtain a transparent or translucent plastic film capable of being manufactured at low costs and exhibiting excellent performance as a covering sheet material of a greenhouse to arrive at a discovery that the object can be achieved with a double-layered composite plastic film consisting of a substrate film and an overlayer formed by coating or lamination on one surface of the substrate film when and only when these two layers satisfy specific relationships in connection with two parameters including, one, the total heat volume and, the other, the absorptivity of radiation heat, the values of these parameters each being smaller in the overlayer than in the substrate film by a specified proportion.

The total heat volume of a layer, expressed by a symbol Q, here implied is a value given as a product of the total volume of the layer, expressed by V, density thereof, expressed by d, and specific heat capacity thereof, expressed by c, and is given by the equation:

$$Q = V \cdot d \cdot c,$$

or $$Q = W \cdot c,$$

where $W = V \cdot d$ or the total weight of the layer. Taking the subscripts 1 and 2 as corresponding to the first and second layers, respectively, the total heat volume of the respective layers $Q_1$ and $Q_2$ are given by the equations:

$$Q_1 = V_1 \cdot d_1 \cdot c_1 = W_1 \cdot c_1;$$

and $$Q_2 = V_2 \cdot d_2 \cdot c_2 = W_2 \cdot c_2,$$

respectively. The values of specific heat capacity $c_1$ and $c_2$ are each a constant inherent in the respective materials and a function of the temperature. Accordingly, it is important to use a value of the specific heat capacity determined for each material at the outside air temperature when the composite film is used as a covering sheet material of the greenhouse. The values of specific heat capacity can be readily determined by using a conventional apparatus therefor.

In the next place, the absorptivity of radiation heat, expressed by a symbol X, here implied is a percentage given by the equation:

$$X = (T - T')/T \times 100,$$

where T is the radiation temperature of the sunlight falling on the film and T' is the radiation temperature of the sunlight after transmission through the film. Taking the subscripts 1 and 2 as corresponding to the first and second layers, respectively, the absorptivity of radiation heat of the respective layers $X_1$ and $X_2$ are given by the equations:

$$X_1 = (T_1 - T'_1)/T_1 \times 100,$$

and $$X_2 = (T_2 - T'_2)/T_2 \times 100.$$

The thermoplastic resin forming the substrate film as the first layer of the inventive composite plastic film is not particularly limitative and can be selected from conventional thermoplastic resins used as a material of films for agricultural use. Examples of suitable thermoplastic resins include polyvinyl chloride resins, polyvinylidene chloride resins, polyethylenes, polypropylenes, polystyrenes, polyethylene terephthalates, polyhexamethylenediamine adipates, polycaprolactams, polymethyl methacrylates, polymethyl acrylates, polyvinyl acetates and the like as well as related copolymers mainly composed of the monomeric units in common with the above named polymers and polymer blends thereof. Among the above named plastic resins, polyvinyl chlorides, polymethyl methacrylates and Polyethylenes are particularly preferable in respect of the good balance of properties such as lightfastness, transmissivity to light, mechanical strengths and the like.

It is of course optional that these thermoplastic resins are admixed with known additives conventionally used in plastic films for agricultural use including, for example, plasticizers, lubricants, heat stabilizers, ultraviolet absorbers, antistatic agents, anti-dewing agents, anti-fogging agents, coloring agents and the like according to need.

A particularly preferable plastic resin composition as a material of the substrate in the inventive composite plastic film is a plasticized polyvinyl chloride-based resin composition comprising 100 parts by weight of a polyvinyl chloride resin having an average degree of polymerization in the range from 1000 to 2000 or, preferably, from 1300 to 1800 and from 30 to 80 parts by weight or, preferably, from 40 to 60 parts by weight of a plasticizer. Examples of the plasticizer suitable for use in this case include phthalate esters such as di-n-octyl phthalate, di-2-ethylhexyl phthalate, dipentyl phthalate, didecyl phthalate and diisooctyl phthalate, adipate-esters such as di-n-butyl adipate and dioctyl adipate, maleic acid esters such as di-n-butyl maleate and diisooctyl maleate and itaconic acid esters such as monobutyl itaconate and monoamyl itaconate as well as glycerin monoricinoleate, tricresyl phosphate and epoxidized soybean oil.

Examples of the lubricant admixed with the resin composition according to need include polyethylene waxes, liquid paraffin, stearic acid and salts thereof and higher aliphatic alcohols. Examples of the heat stabilizers include dibutyl tin dilaurate and dibutyl tin dimaleate. Examples of the antistatic agents or anti-dewing agents include non-ionic surface active agents such as polyoxyethylene glycerin monostearate. Examples of the coloring agents include titanium dioxide, calcium carbonate, precipitated silica, phthalocyanine blue and phthalocyanine green. Examples of the ultraviolet absorbers include hydroquinone, 2-hydroxy-4-methoxy benzophenone, 2,2'-dihydroxy-4,4'-dimethoxy benzophenone, 2-(2'-hydroxy-5'-methylphenyl)benzotriazole and 2-(2'-hydroxy-5'-tertbutylphenyl)benzotriazole. These optional additives are compounded with the resin composition each in such a limited amount as not to cause any adverse influences on the properties inherent in the resin composition as a film substrate. For example, the total amount thereof should not exceed 20% by weight based on the total amount of the resin composition.

The above described plastic resin composition comprising the thermoplastic resin and additives can be shaped into a plastic film or sheet to serve as the substrate in the inventive composite plastic film by a known plastic molding method such as melt-extrusion method, solution casting method, calendering method and inflation method. The substrate film or sheet has a thickness in the range from 20 to 1000 μm or, preferably, from 50 to 500 μm.

The second layer, i.e. the transparent overlayer, formed on one surface of the substrate film is made from a thermoplastic resin, desirably, having a relatively small specific heat capacity such as polyethylene terephthalate, polyethylene isophthalate, polybutylene terephthalate, copolymers of styrene and acrylic acid or an ester thereof and addition products of a diisocyanate compound to a copolymer of acrylic acid and styrene though not particularly limitative thereto. The overlayer is not necessarily colorless if not so deeply colored but it is essentially transparent in order not to decrease the amount of insolation into the greenhouse. The method for forming the transparent overlayer on one surface of the substrate film is not particularly limitative including coating of the substrate surface with a solution of the above mentioned polymeric resin, lamination of a pre-shaped film of the resin to the substrate surface, co-extrusion method of the two layers and thermocompression bonding. The thickness of the transparent overlayer is in the range from 1to 30 μm or, preferably, from 3 to 20 μm. It is optional that the transparent overlayer contains ultraviolet absorbers, oxygen-barrier agents, anti-dewing agents, anti-fogging agents and others according to need.

It is essential in the inventive composite plastic film that the first layer, i.e. substrate film or sheet, and the second layer, i.e. transparent overlayer, satisfy the relationship in two parameters given by the inequalities of:

$$0.10Q_1 \geq Q_2; \quad (1)$$

and $$0.60X_1 \geq X_2, \quad (2)$$

in which $Q_1$ and $Q_2$ are the total heat volumes of the first and second layers, respectively, and $X_1$ and $X_2$ are each the absorptivities of radiation heat of the first and second layers, respectively.

In order that the above given relationships can be satisfied, it is important that the material of the overlayer is selected from polymeric resins having a relatively small specific heat capacity and admixed with an additive capable of absorbing the sunlight so as to decrease the heat volume per unit volume and the absorptivity of radiation heat of the material per se along with a decrease in the thickness of the overlayer. In addition, it is also important that the plastic resin composition for the substrate is admixed with an additive which may increase the specific heat capacity of the resin composition along with an increase in the thickness of the substrate so as to increase the total heat volume $Q_1$ of the substrate.

Following is an explanation of the basic principle leading to the present invention.

As is well known, transfer of heat takes place in three different ways including convection, conduction and radiation and actual heat transfer proceeds always as a combination of these different ways. In an ordinary state, the flow of heat q by the convection and conduction of heat is given by the equation:

$$q = \alpha_1(T_r - T_H) = \lambda/L(T_H - T_L) = \alpha_0(T_L - T_0),$$

in which $\alpha_1$ is the coefficient of heat transfer of a fluids at a high temperature, $\alpha_0$ is the coefficient of heat transfer of a fluid at a low temperature, $T_r$ is the temperature of the fluid at the high temperature, $T_0$ is the temperature of the fluid at the low temperature, $T_H$ is the temperature of the partition wall at the high temperature side, $T_L$ is the temperature of the partition wall at the low temperature side, $\lambda$ is the heat conductivity coefficient of the partition wall and L is the thickness of the partition wall. As is understood from this equation, heat is first transferred from the high-temperature fluid to the high-temperature surface of the partition wall, then flows through the partition wall from the high-temperature surface to the low-temperature surface by heat conduction and finally is transferred from the low-temperature surface of the partition wall to the low-temperature fluid.

When a room is surrounded by partition walls made from a transparent material such as a plastic resin film, which transmits the sunlight of short wavelength but absorbs long-wavelength light secondarily generated, on the other hand, the inside temperature of the room is gradually increased as a tendency due to the heat of radiation because of the heat energy given by the sunlight while the heat is never emitted outwardly from inside of the room. In a greenhouse for agricultural crop growing covered with a plastic resin film, for example, the inside temperature of the greenhouse is sometimes excessively increased in a summer season because the short-wavelength portion of the sunlight introduces heat energy into inside of the greenhouse while outward radiation of long-wavelength light is barriered by the covering plastic resin film resulting in growth inhibition of the plants or a decrease in the yield of the products. Namely, the transparent wall is responsible in such a state for the excessive temperature elevation in the greenhouse because the wall is at a high temperature by the absorption of the solar energy while inhibiting outward dissipation of heat.

To explain it in more detail, a wall heated to a high temperature by absorbing the radiation heat usually has such a cross sectional temperature distribution profile that the temperature is the highest in the core layer and the temperature of the surfaces is lower than that due to the cooling effect given by contacting with the atmospheric air. When the wall is intensely irradiated with sunlight, the temperature of the core layer of the wall is sometimes higher than the temperature of the air confined in the room surrounded by the walls and heated at an increased temperature or, in any event, is never lower than the temperature of the room air so that there is no possibility of heat transfer through the walls from inside of the room toward the outer atmosphere. Accordingly, the heat in the inside of the room can be outwardly transferred only by decreasing the temperature of the walls.

A high-temperature body placed in the atmospheric air is continuously deprived of heat as a consequence of the convection in the air so that the temperature of the body is gradually decreased. The rate of temperature decrease in this case is increased as the specific heat capacity of the body is decreased and the volume thereof is decreased. In other words, the rate of temperature decrease is increased as the product of the specific heat capacity and the total volume or so-called total heat volume is decreased.

When a covering sheet of a greenhouse is a composite plastic film consisting of two layers, of which the layer facing the outside atmospheric air has a total heat volume smaller than the layer facing inwardly, accordingly, the quantity of heat carried away by the convection of air on the outer surface is increased so much that a rapid decrease is caused in the temperature of the covering sheet on the surface facing outwardly. Consequently, an increase is caused in the difference of temperature between the core layer of the composite film and the surface of the composite film facing the outside atmospheric air so that the heat flows in the direction from the substrate layer to the outer surface of the composite film facing outwardly resulting in a decrease in the quantity of heat accumulated in the whole body of the composite film with a decrease in the temperature of the composite film. As a consequence, an outward flow of heat is initiated from inside of the greenhouse.

It is generally held that the temperature of a body under irradiation with sunlight is increased so much as the absorption of radiation heat is increased so that, when the absorptivity of radiation is large in the above mentioned layer formed on the substrate layer, the temperature of the overlayer becomes higher than the temperature of the substrate layer and consequently the outward heat flow from inside of the greenhouse is interrupted and the desired effect to decrease the inside temperature of the greenhouse cannot be achieved. This fact is the ground for the requirement that the overlayer formed on the substrate layer and facing the outside atmospheric air should have a smaller absorptivity of radiation than that of the substrate layer.

The above given description is an explanation of the mechanism by which an excessive temperature increase in a greenhouse can be suppressed in a high-temperature season such as summer. On the other hand, it is required in a low-temperature season such as winter to decrease the heat flow from inside of the house to the outer atmospheric air in order to prevent excessive temperature decrease in the greenhouse. This requirement can be satisfied by providing a substrate layer of the covering sheet of the greenhouse with an overlayer having a small total heat volume and a small absorptivity of radiation on the surface of the substrate layer opposite to the surface facing the outer atmospheric air. In this way, the heat flows in the direction from the outer atmospheric air to the inside of the greenhouse resulting in an increase in the inside temperature of the greenhouse.

As being guided by the above described basic principle, the inventors have undertaken extensive investigations arriving at a discovery that a composite plastic film suitable for practical use as a covering sheet of a greenhouse and a high-performance greenhouse by use thereof can be obtained when and only when the substrate layer and the transparent overlayer formed thereon forming a composite film satisfy the above given inequalities (1) and (2) or, in other words, when and only when the transparent overlayer has a total heat volume not exceeding 10% or, preferably, not exceeding 5% of that of the substrate layer and a absorptivity of radiation not exceeding 60% or, preferably, not exceeding 50% of that of the substrate layer.

It is of course optional that, like conventional plastic films for agricultural use, the substrate layer of the composite film is provided on the surface opposite to the transparent overlayer with an auxiliary layer such as an anti-dewing layer, oxygen-barrier layer, protective layer and the like according to need. In some cases, an adhesive layer is interposed between the substrate layer and the transparent overlayer. The values of the total heat volume and the absorptivity of radiation to be substituted in the inequalities for the substrate must be calculated by taking into account inclusion of the values corresponding to these additional layers.

Figure 3:
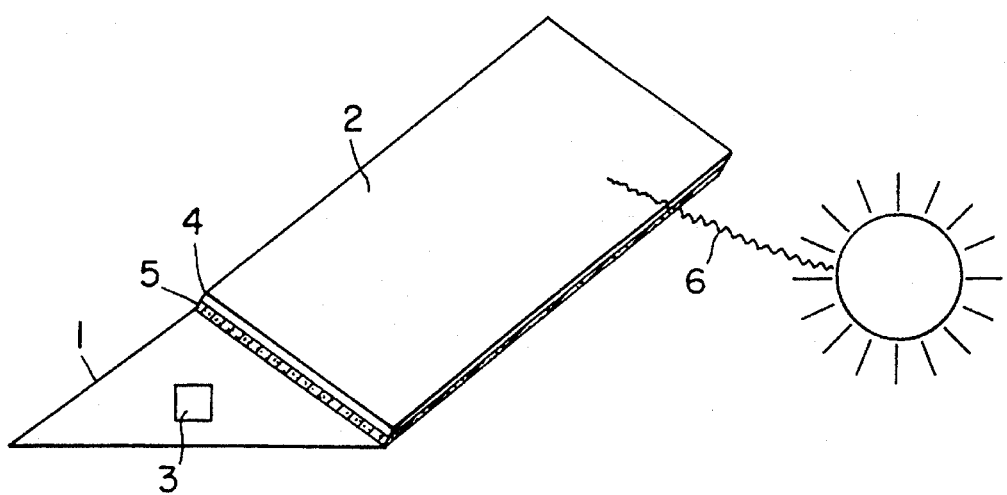
FIG. 3 is a perspective view of a greenhouse of the present invention with the covering sheet having the substrate film facing outward.
Figure 4:
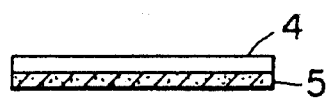
FIG. 4 is a side view of the film of the present invention.
Figure 5:
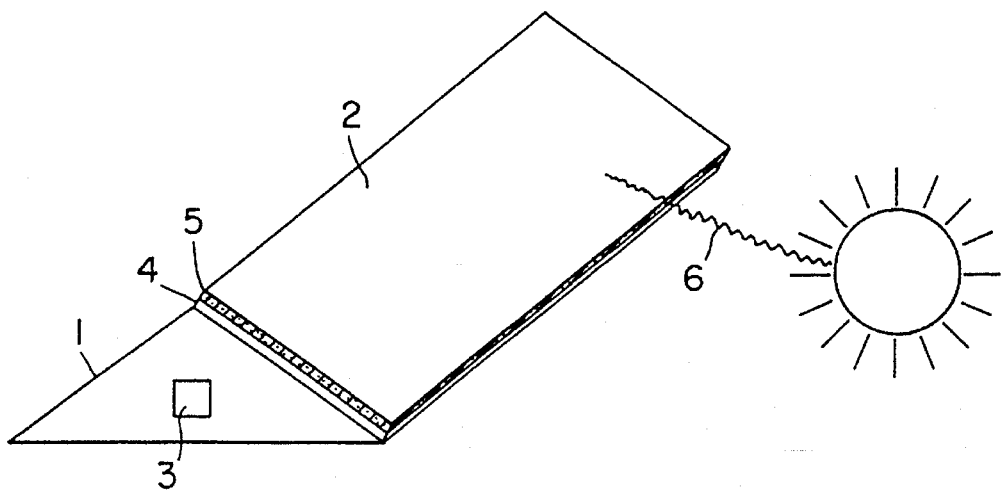
FIG. 5 is a perspective view of a greenhouse of the present invention with the covering sheet positioned with the substrate film facing inward.

The composite plastic film having a constitution described above can be used as a covering sheet of a greenhouse in a conventional manner as seen in FIGS. 3 and 5 by spreading over and connecting to the framework of the greenhouse. The framework of the greenhouses (1) can be made from any conventional materials including woody, metallic and plastic materials. In the construction of a greenhouse by using the composite plastic film, it is generally advisable that the composite film is spread over the framework with the transparent overlayer 5 facing the outer atmosphere and the substrate film 4 facing the interior of the greenhouse. In the winter season this may be reversed and the overlayer is provided facing the inside of the greenhouse as seen in FIG. 3.

In a greenhouse adequately built according to the invention, it is possible during the period from 10 o'clock in the morning to 3 o'clock in the afternoon of a summer day to keep the inside temperature of the greenhouse by 6° to 10° C. lower than in a conventional greenhouse and it is possible during the period from 1 o'clock to 6 o'clock in the afternoon of a winter day to keep the inside temperature of the greenhouse by 2° to 5° C. higher than in a conventional greenhouse.

Needless to say, the crops which can be grown in the greenhouse of the invention are not limited to specific ones and any plants can be grown therein including leaf vegetables and fruit vegetables such as spinachs, lettuces, celeries, leeks, cabbages, Chinese cabbagers, peas, green peppers, tomatoes, cucumbers, eggplants, pumpkins, strawberries, melons and water melons as well as flowering plants such as chrysanthemums, carnations, roses and tulips without particular limitations.

In the following, examples are given to illustrate the present invention in more detail.

EXAMPLE 1

A solution containing 8% by weight of non-volatile matter was prepared by dissolving a copolymeric resin of acrylonitrile and styrene, of which the content of the acrylonitrile moiety was 30% by weight, in a solvent mixture consisting of ethyl acetate, toluene, isopropyl alcohol, butyl acetate and methyl alcohol. A coating solution for a transparent overlayer to be formed on a substrate film was prepared by admixing 100 parts by weight of the above prepared resin solution with 0.03 part by weight of a dimethyl silicone oil modified with an alkyl aralkyl polyether (SF 8419, a product by Toray Dow Corning Silicone Co.) and further, under thorough agitation, with 0.5 part by weight of 2-(5-methyl-2-hydroxyphenyl)benzotriazole and 0.5 part by weight of 2-(3,5-di-tert-butyl-2-hydroxyphenyl)benzotriazole.

A parallelopiped box having dimensions of 50 cm by 50 cm by 100 cm, of which one of the 50 cm by 100 cm surfaces was open, referred to as the testing box hereinafter, was prepared with 5 mm thick foamed polystyrene boards and the inside of the box was partitioned with a foamed polystyrene board of the same thickness into two equal compartments by dividing at the center position along the 100 cm long side thus to form two openings of each about 50 cm by 50 cm wide.

Separately, several composite plastic films were prepared each by uniformly coating a polyvinyl chloride film having a thickness of 100 μm, referred to as the control film hereinafter, with the above prepared coating solution in varied coating amounts followed by drying to form a transparent overlayer having a varied thickness of up to 22 μm.

One of the two openings in the above prepared partitioned testing box was covered with the control film in a slack-free fashion and the other opening was covered similarly with one of the above prepared composite plastic films with the transparent overlayer facing outwardly.

The partitioned compartments in the box thus covered, one, with the control film and, the other, with the composite film were irradiated with four infrared lamps of each 500 watts output positioned above the opening in a substantially perpendicular direction under an ambient temperature of 20° C. and the temperature in the respective compartments was measured after 0.5, 1 and 3 hours from the start of the infrared irradiation to give the results shown in Table 1 below, in which $Q_1$ and $Q_2$ are the total heat volume of the control film and the overlayer, respectively, and $X_1$ and $X_2$ are the absorptivity of radiation heat of the control film and the overlayer, respectively. The total heat volume of the control film was about 9.56 cal/°C.

TABLE 1

| Thickness of overlayer, μm | 22.0 | 14.6 | 7.3 | 3.7 | 1.47 | control |
|---|---|---|---|---|---|---|
| $(Q_2/Q_1) \times 100$ | 30 | 20 | 10 | 5 | 2 | — |
| $(X_2/X_1) \times 100$ | 25 | 21 | 18 | 10 | 5 | — |
| Temperature, °C., after 0.5 hour | 50 | 49 | 45 | 43 | 42 | 51 |
| 1 hour | 53 | 51 | 46 | 45 | 45 | 54 |
| 3 hours | 54 | 53 | 49 | 48 | 47 | 56 |

EXAMPLE 2

The partitioned testing box was constructed in the same manner as in Example 1 except that the composite film was spread over one of the openings with the transparent over layer facing inwardly. At an ambient temperature of 10° C., each of the compartments was heated to have a temperature of 30° C. and then allowed to stand for spontaneous cooling and record was made for the decreased temperature in each compartment after 0.5 hour, 1 hour and 3 hours from the start of spontaneous cooling. The results are shown in Table 2.

TABLE 2

| Thickness of overlayer, μm | 22.0 | 14.6 | 7.3 | 3.7 | 1.47 | control |
|---|---|---|---|---|---|---|
| $(Q_2/Q_1) \times 100$ | 30 | 20 | 10 | 5 | 2 | — |
| $(X_2/X_1) \times 100$ | 25 | 21 | 18 | 10 | 5 | — |
| Temperature, °C., after 0.5 hour | 26.0 | 26.0 | 26.5 | 26.5 | 27.0 | 25.0 |
| 1 hour | 17 | 24 | 25 | 25 | 26 | 16 |
| 3 hours | 13 | 16 | 18 | 18 | 19 | 14 |

EXAMPLE 3

The experimental procedure was the same as in Example 1 except that the overlayer on the control film always had a thickness of 10 μm and formed by coating with another coating solution prepared by admixing the coating solution prepared in Example 1 with varied amounts of a dye (Kayaset Black, a product by Nippon Kayaku Co.) and an ultraviolet absorber (IRG 820B, a product by the same company as above) to control the absorptivity of radiation heat. The results of the temperature elevation test were as shown in Table 3 below.

TABLE 3

| Thickness of overlayer, μm | | | 10 | | | control |
|---|---|---|---|---|---|---|
| $(Q_2/Q_1) \times 100$ | 20 | 19 | 16 | 16 | 15 | — |
| $(X_2/X_1) \times 100$ | 81 | 65 | 58 | 41 | 20 | — |
| Temperature, °C., after 0.5 hour | 52 | 52 | 49 | 47 | 45 | 51 |
| 1 hour | 55 | 54 | 50 | 48 | 47 | 54 |
| 3 hours | 58 | 56 | 53 | 51 | 50 | 56 |

EXAMPLE 4

A 100 μm thick polyvinyl chloride film having a specific gravity of 1.530 and a specific heat capacity of 0.25 cal/g·°C. was coated on one surface with the coating solution prepared in Example 1 followed by drying to form a transparent overlayer having a thickness of about 3 μm. The thus prepared composite plastic film was spread over a framework having a frontage of 5.4 meters, depth of 10 meters and height of 1.5 meters in a slack-free fashion and connected to the frame members thus to construct a test greenhouse. The parameters $Q_1$, $Q_2$, $X_1$ and $X_2$ in the composite film were: $Q_1$=4207 cal/°C. and $Q_2$=172.1 cal/°C. with $(Q_2/Q_1) \times 100$ of 4.1% and $X_1$=19 and $X_2$=1.9 with $(X_2/X_1) \times 100$ of 10%.

The test greenhouse was installed on an open ground in such an orientation that the 10 meters long side was along the north-to-south direction with a ventilation opening provided only on the plane facing south.

Another greenhouse for control purpose having just the same dimensions as the above described test greenhouse was constructed excepting replacement of the composite plastic film with the uncoated polyvinyl chloride film. This control greenhouse was installed in adjacency to the test greenhouse also along the north-to-south direction with the southern end plane thereof just to face the northern end plane of the test greenhouse.

Leaf lettuces were grown in each of these two greenhouses under monitoring of the climatic conditions and insolation therein. FIG. 1 of the accompanying drawing shows the records of temperature on Apr. 9th, 1993 from 5:00 a.m. to 9:00 p.m. with the solid line for the test greenhouse and broken line for the control greenhouse. The leaf lettuces were harvested on Jun. 1st of the year. The harvested weight of the fresh leaf lettuces was 75.56 kg in the test greenhouse while the weight was 69.46 kg in the control greenhouse.

EXAMPLE 5

The same box test as in Example 1 was performed excepting for the replacement of the composite plastic film with another composite plastic film which was prepared by the hot lamination of a substrate film of a polyvinyl chloride resin of 300 μm thickness having a specific gravity of 1.530, a specific heat capacity of 0.25 cal/g·°C. and an absorptivity of radiation heat of 35% with an overlay film of a polyester resin of 30 μm thickness having a specific gravity of 0.920, a specific heat capacity of 0.55 cal/g·°C. and an absorptivity of radiation heat of 14%. The temperature in the test compartment of the box, which was 20° C. at the start, was 45° C., 47° C. and 49° C. after 30 minutes, 1 hour and 3 hours, respectively.

EXAMPLE 6

The same test as in Example 1 was performed with varied thickness of the transparent overlayer except that the substrate of the composite plastic film was a high-density polyethylene film of 150 μm thickness having a specific gravity of 0.960, specific heat capacity of 0.55 cal/g·°C. and absorptivity of radiation heat of 26%. Table 4 below shows the recorded temperatures in the test compartments and in the control compartment.

TABLE 4

| Thickness of overlayer, μm | 20.0 | 12.4 | 10.2 | 5.1 | 1.2 | control |
|---|---|---|---|---|---|---|
| $(Q_2/Q_1) \times 100$ | 15 | 10 | 5 | 2.5 | 0.5 | — |
| $(X_2/X_1) \times 100$ | 20 | 17 | 15 | 6 | 2 | — |
| Temperature, °C., after 0.5 hour | 48 | 46 | 44 | 43 | 41 | 52 |
| 1 hour | 50 | 47 | 45 | 44 | 42 | 55 |
| 3 hours | 52 | 50 | 48 | 47 | 45 | 58 |

EXAMPLE 7

A test greenhouse and a control greenhouse were built in just the same manner as in Example 4 except that the coating solution prepared in Example 1 was replaced with another coating solution prepared by dissolving two copolymeric resins of an acrylic acid ester and styrene (Kayacryl Resins P4872 and P5100 (each a commercial product by Nippon Kayaku Co.) in equal amounts in a 1:3 mixture of ethyl acetate and isopropyl alcohol with admixture of the same silicone oil SF8419 as in Example 1. The parameters $Q_1$, $Q_2$, $X_1$ and $X_2$ in the thus prepared composite film, of which the transparent overlayer had a thickness of 3 μm, were: $Q_1$=4207 cal/°C. and $Q_2$=13.3 cal/°C. with $(Q_2/Q_1) \times 100$ of 3.1% and $X_1$=12 and $X_2$=1.6 with $(X_2/X_1) \times 100$ of 13.3%.

Figure 2:
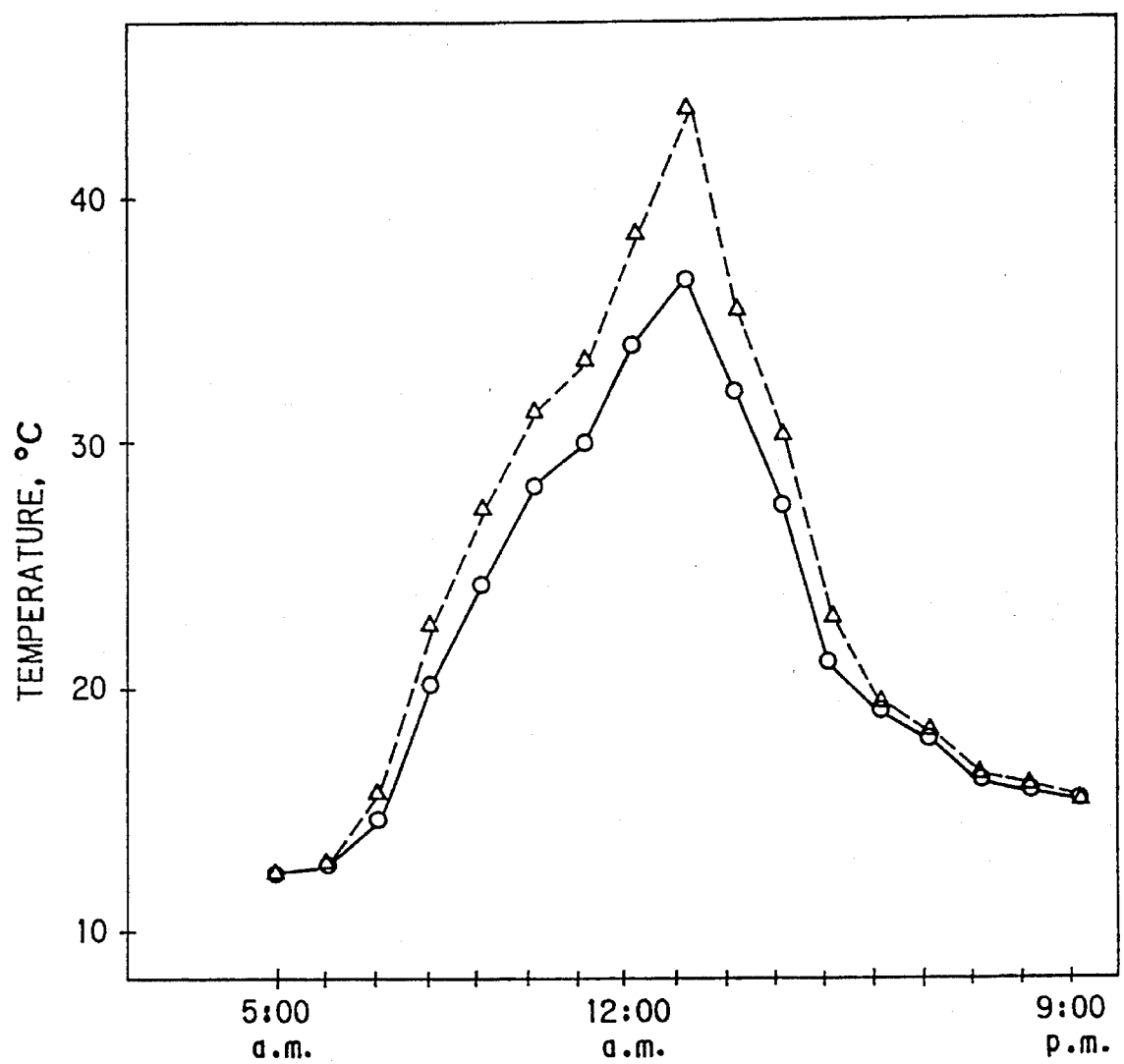
FIG. 2 is a similar graph to FIG. 1 obtained in Example 7 showing the temperature changes in another test greenhouse and control greenhouse.

The temperature in the test and control greenhouses was recorded on Mar. 31, 1993 from 5:00 a.m. to 9:00 p.m. to give the results shown in FIG. 2 of the accompanying drawing, in which the solid line is for the test greenhouse and the broken line is for the control greenhouse.

What is claimed is:

1. A transparent or translucent double-layered composite plastic film which consists of:

(a) a first layer which is a transparent or translucent substrate film comprising a thermoplastic resin; and (b) a second layer which is a transparent overlayer comprising a themoplastic resin formed on one surface of the substrate film, the overlayer having a total heat volume not exceeding 10% of the total heat volume of the substrate film and having an absorptivity of radiation heat not exceeding 60% of the absorptivity of radiation heat of the substrate film.

2. A greenhouse which is a construction having a structure comprising:

(A) a framework; and (B) a covering sheet material spread over and connected to the framework, which is a transparent or translucent double-layered composite plastic film consisting of:

(a) a first layer which is a transparent or translucent substrate film comprising a thermoplastic resin; and (b) a second layer which is a transparent overlayer comprising a themoplastic resin formed on one surface of the substrate film, the overlayer having a total heat volume not exceeding 10% of the total heat volume of the substrate film and having an absorptivity of radiation heat not exceeding 60% of the absorptivity of radiation heat of the substrate film.

3. The greenhouse as claimed in claim 2 in which the covering sheet is spread over the framework in such a fashion that the substrate film faces outwardly of the greenhouse and the transparent overlayer faces inwardly of the greenhouse.

4. The greenhouse as claimed in claim 2 in which the covering sheet is spread over the framework in such a fashion that the substrate film faces inwardly of the greenhouse and the transparent overlayer faces outwardly of the greenhouse.

5. The greenhouse as claimed in claim 2 in which the thermoplastic resin forming the substrate film is selected from the group consisting of polyvinyl chloride resins, polymethyl methacrylate resins, polyethylene resins and resin compositions thereof.

6. The greenhouse as claimed in claim 5 in which the thermoplastic resin forming the substrate film is a polyvinyl chloride resin composition comprising 100 parts by weight of a polyvinyl chloride resin having an average degree of polymerization in the range from 1000 to 2000 and from 30 to 80 parts by weight of a plasticizer.

7. The greenhouse as claimed in claim 2 in which the substrate film has a thickness in the range from 20 to 1000 μm.

8. The greenhouse as claimed in claim 2 in which the thermoplastic resin forming the overlayer is selected from the group consisting of polyethylene terephthalate, polyethylene isophthalate, polybutylene terephthalate, copolymers of acrylic acid or an alkyl ester thereof and styrene and reaction products of a copolymer of acrylic acid and styrene with a diisocyanate compound.

9. The greenhouse as claimed in claim 2 in which the overlayer has a thickness in the range from 1 to 30 μm.

* * * * *

UNITED STATES PATENT AND TRADEMARK OFFICE
CERTIFICATE OF CORRECTION

PATENT NO. : 5,519,964
DATED : May 28, 1996
INVENTOR(S) : Masami KUJIRAI et al.

It is certified that error appears in the above-indentified patent and that said Letters Patent is hereby corrected as shown below:

IN THE DRAWINGS:

Figs. 1 and 2, "TEMPARATURE" has been corrected to --TEMPERATURE, --.

Col. 1, lines 14 and 34, change "insolation" to --insulation--.

Col. 2, line 3, change "insolation" to --insulation--;

Col. 8, line 16, delete "leaf", delete "vegetables", change "spinachs" to --spinach--, and change "lettuces" to --lettuce--;

line 18, change "celeries" to --celery--, and change "cabbagers" to --cabbages--.

UNITED STATES PATENT AND TRADEMARK OFFICE
CERTIFICATE OF CORRECTION

PATENT NO. : 5,519,964
DATED : May 28, 1996
INVENTOR(S) : Masami KUJIRAI et al.

It is certified that error appears in the above-indentified patent and that said Letters Patent is hereby corrected as shown below:

Col 8, line 20, change "water melons" to --watermelons--; and

Col. 10, line 22, change "limitations" to --limitation--.

line 5, after "opening" insert --3 in Figs. 3 and 5--.

Signed and Sealed this

First Day of April, 1997

Attest:

BRUCE LEHMAN

Attesting Officer

Commissioner of Patents and Trademarks